United States Patent [19]

McLean et al.

[11] 4,315,609
[45] Feb. 16, 1982

[54] TARGET LOCATING AND MISSILE GUIDANCE SYSTEM

[75] Inventors: James D. McLean; Frederick C. Alpers, both of Riverside; George R. Lanning, San Diego; Fred H. Camphausen, China Lake, all of Calif.

[73] Assignee: The United States of America as represented by the Secretary of the Navy, Washington, D.C.

[21] Appl. No.: 154,235

[22] Filed: Jun. 16, 1971

[51] Int. Cl.³ .............................................. F41G 7/28
[52] U.S. Cl. ................................ 244/3.14; 343/7 ED
[58] Field of Search .................... 343/7 ED; 244/3.16, 244/3.14

[56] References Cited

U.S. PATENT DOCUMENTS

3,073,550  1/1963  Young ............................ 343/7 ED
3,560,971  2/1971  Alsberg et al. .................. 343/7 ED Primary Examiner—Charles T. Jordan
Attorney, Agent, or Firm—R. S. Sciascia; E. F. Johnston; T. M. Phillips

[57] ABSTRACT

A target locating and missile guidance system comprising reconnaissance aircraft equipped with laser or radar range-measuring apparatus in conjunction with a plurality of selectively predetermined ground stations. Range and altitude of the aircraft relative to a detected surface target are obtained at two or more points on its flight path. The positions of the aircraft with respect to the ground stations are simultaneously determined by pulse-time-of-arrival technique. Using triangulation techniques the location of the target is determined with respect to a pulse grid coordinate system associated with the ground stations. At any time after the determination of the location of the target, properly timed signals from the ground stations or command signals based upon time-of-arrival data with respect to pulses from the missile are used to provide accurate guidance of the missile to the target.

13 Claims, 21 Drawing Figures

TARGET LOCATING AND MISSILE GUIDANCE SYSTEM

STATEMENT OF GOVERNMENT INTEREST

The invention described herein may be manufactured and used by or for the Government of the United States of America for governmental purposes without the payment of any royalties thereon or therefor.

SUMMARY OF THE INVENTION

In many tactical situations it is possible to visually detect fixed surface targets by using reconnaissance aircraft, or alternatively to detect such targets by the use of high resolution radars, but it is not possible to attack them with high accuracy unless they happen to be within range of precision artillery or happen to present a high contrast so that homing weapons can be used. The present invention provides a system of target location and missile guidance that will establish the location of such targets with a circular probable error of 20 to 30 feet, and subsequently to attack such targets with a circular probable error of 30 to 50 feet regardless of weather or visibility conditions.

Accordingly an object of the invention is the provision of a means for locating a target with high precision with respect to an artificial coordinate system and directing missiles to the established target location with high accuracy.

Other objects and many of the attendant advantages of this invention will be readily appreciated as the same becomes better understood by reference to the following detailed description when considered in connection with the accompanying drawings wherein:

There are two functions involved in practicing the present invention; (1) target location (as distinct from simply seeing or detecting the target), and (2) missile guidance. These may be undertaken in immediate succession, or the attack phase involving missile guidance may be delayed to some later time, e.g., an attack on a road intersection at night when use by the enemy is suspected.

Figure 1:
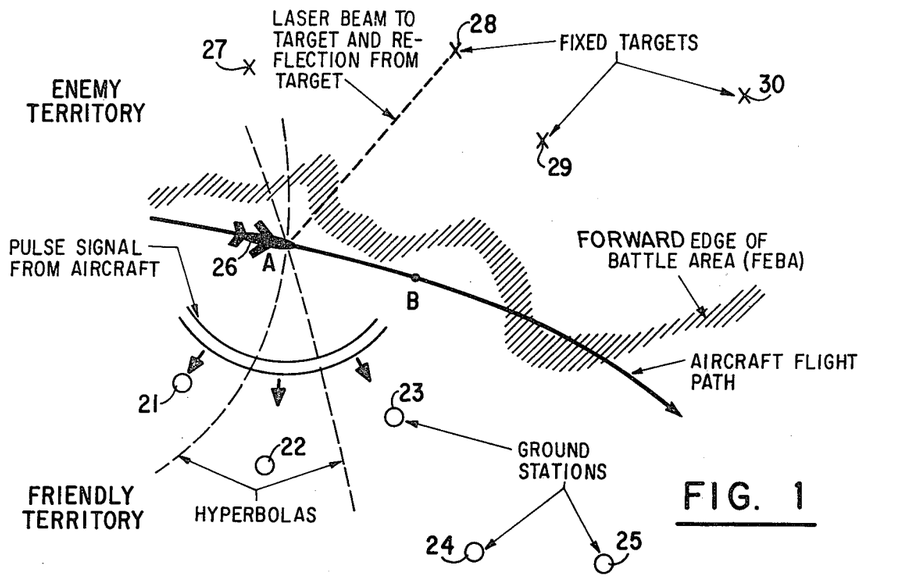
FIG. 1 is a diagram of the operational arrangement for target location.

The typical situation that prevails and the operational elements that are involved in target locations are illustrated in FIG. 1. A number of portable ground stations 21-25 are set up at advantageous points within friendly territory. These should be high points since it is required that each have unobstructed lines of sight to the air space above enemy territory. However, there will typically be many potential ground targets in enemy territory that are not visible, or at least not recognizable, from these ground station locations. To detect these targets a reconnaissance aircraft 26 is flown near the forward edge of the battle area that separates friendly held territory from that held by the enemy, and the pilot or observer in the aircraft, spots the targets, 28-30 and designates them for attack. (In some instances where terrain permits, ground-based forward observers within line of sight of both the target and the ground stations may replace the airborne observer in this spotting and designation function.)

Figure 2:
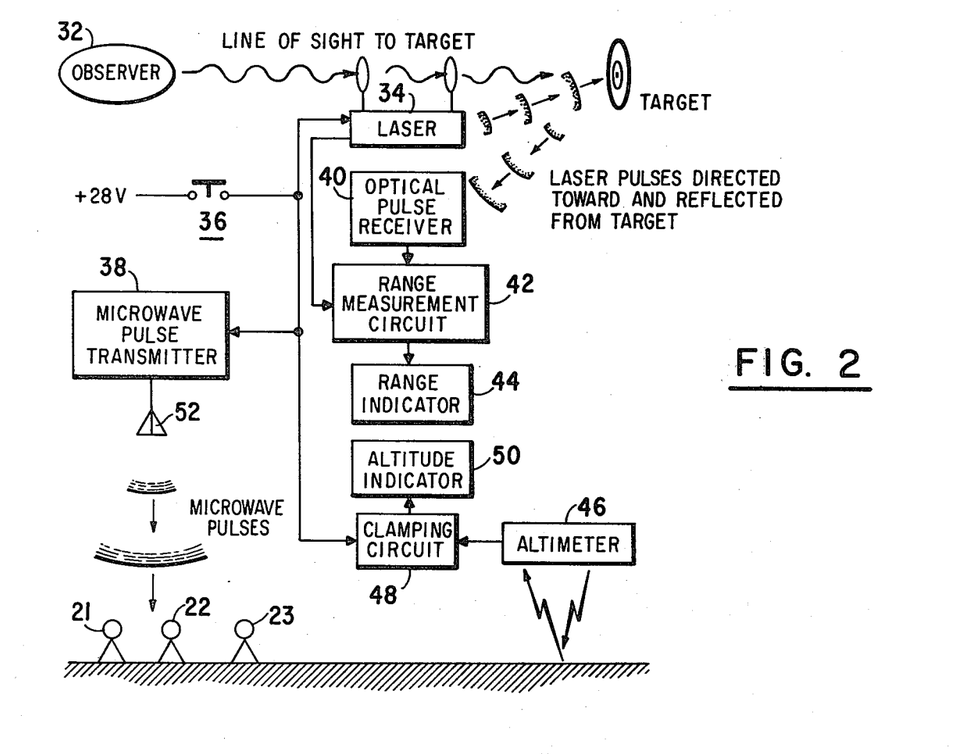
FIG. 2 is a block diagram of aircraft equipment used for target location.

To initiate the target location process, an observer 32 (FIG. 2) aims a pulsed laser 34 at the target and closes target switch 36. This activates laser 34 and microwave pulse transmitter 38. Simultaneously the aircraft altitude is recorded by means presently to be described, and is relayed by radio voice communications or other means (not shown) to one of the ground stations. The laser pulses are reflected from the target and detected by receiver 40 and fed to range measurement circuit 42. For targets distinguishable by radar, a high resolution radar may be substituted for the laser in this ranging process. Simultaneously, the microwave pulses from the aircraft travel to at least three of the ground stations, where the times of arrival of the pulses are recorded. These times of arrival, plus the data on the aircraft altitude, are used to establish the aircraft position at that instant in terms of hyperbolic coordinates by means which will be described below. Measurements are made when aircraft 26 is at point (A), and are repeated at point (B). The output of receiver 40 is fed to range measurement circuit 42, which may consist of a high frequency clock and a digital counter that is started by the laser firing pulse and stopped by the received reflected pulse. Range indicator 44 may be an electroluminescent numerical display for the observer. Altimeter 46 may be a radar type or a compensated barometric type, with its output mechanically or electronically stored by clamping circuit 48 when the target switch 36 is closed. Altitude indicator 50 may also be an electroluminescent numerical display similar to that used for range indicator 44. Microwave pulse transmitter 38 should be of the magnetron or other tube pulse type with a sharp rise time, it should emit a short series of pulses, and the interpulse spacing should be reasonably long and irregular so that all three ground stations may readily relate their time of arrival measurements to the same pulse at any one point in the series. Antenna 52 should be so positioned on aircraft 26 to permit transmission to three or more ground stations simultaneously.

Figure 3:
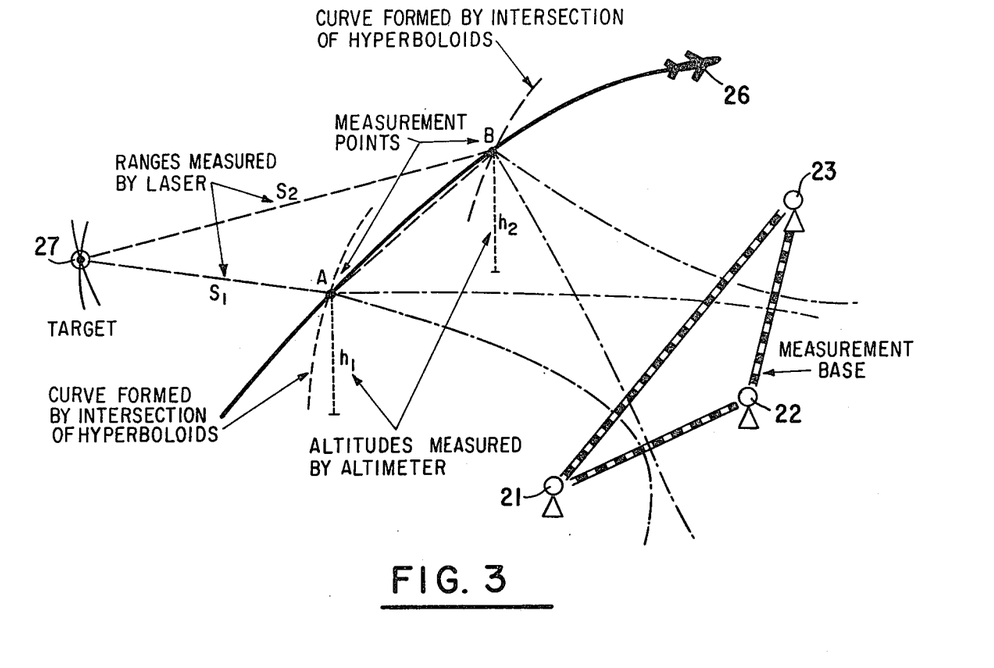
FIG. 3 is a diagram of the geometry involved in locating target position with respect to more than two ground stations.

Referring to FIG. 3, target 27 is to be located in terms of a base of measurement established by the locations of three particular ground stations that are utilized. The ground stations will normally form a triangle, although they may be in a straight line. As shown in FIG. 1, a given microwave pulse emitted by aircraft 26 will reach ground stations, 21, 22, and 23, at three different times. Considering all points to lie in the same plane, the difference in time of arrival between ground stations 21 and 22 will define a hyperbola along which the emission must have originated, and similarly the time of arrival difference between ground stations 22 and 23 will define a second such hyperbola. The actual aircraft position, A, must therefore be at the intersection of the two hyperbolas. Referring now to FIG. 3, for the general case where all the points involved do not happen to lie in the same plane, the time of arrival differences will define hyperboloids, and the intersection of two of these will be a curved line rather than a point. Here the actual aircraft position is at the point along the curve of intersection where the altitude above the terrain is the altitude ($h_1$ or $h_2$) recorded by the aircraft at the time of measurement.

The computation of the hyperboloids, their curve of intersection, and the actual aircraft position at each of measurement can readily be done by a computer, and it will generally be desirable to provide a compact special purpose computer for this function. This can be located at one of the ground stations, in the aircraft, or at some remote point to which the time of arrival and other data can be passed by voice communication or automatic data link.

Figure 4:
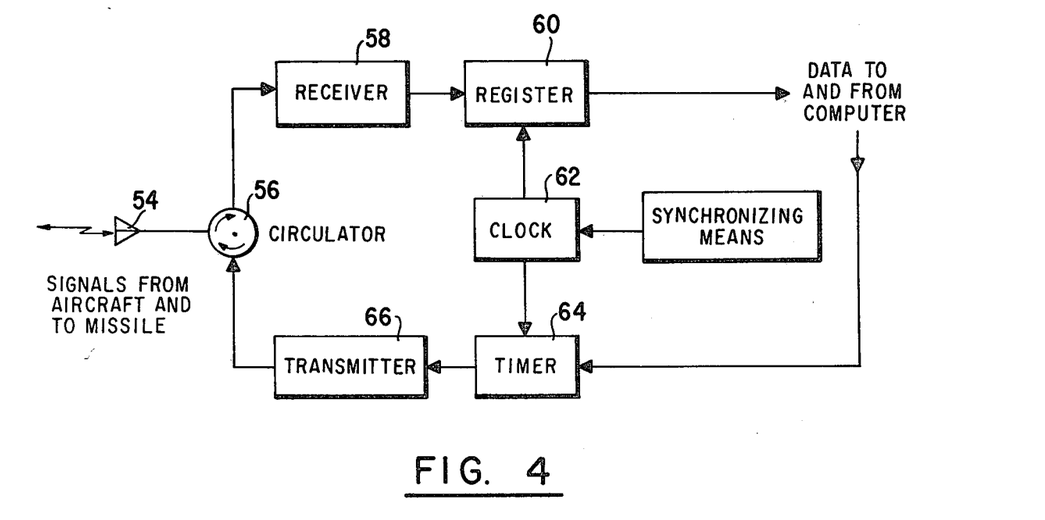
FIG. 4 is a block diagram of a clocking type ground station.

In FIG. 3, the locations of points A and B with respect to the measurement base have now been uniquely established. In order to establish the target position with respect to this same base, it only remains to fix the target position with respect to A and B. With the distances ($S_1$ and $S_2$) to target 27 from A and B respectively measured precisely, circular arcs can be drawn that center on A and B with radii $S_1$ and $S_2$, respectively, and the intersection of these arcs on the surface of the earth (in the same general direction as the target) will define the target location. The location of the target is based on measurements of distance or time and not angle. In FIG. 4 the pulse signals transmitted by microwave transmitter 38 when target switch 36 is closed (FIG. 2) are received at microwave antenna 54. Antenna 54 should be of the broad beam type to receive signals from any direction signals may be transmitted. The received signal at antenna 54 is fed by circulator 56 to receiver 58 for amplification and detection. Receiver 58 should be sufficiently broadband to pass the leading edges of the received pulses with little distortion. The leading edge of each signal triggers digital counter or register 60. An input from clock 62 is also fed to register 60 so the time of arrival of the leading edge of the pulse is indicated. From register 60 the time of arrival data is fed to the computer (not shown). Clocks 62 should be synchronized to provide the same time base for all stations. One means of clock synchronization is shown and described in copending application, Ser. No. 136,989, filed Apr. 23, 1971 for Remote Clock Synchronization System.

Figures 5, 6, 7:
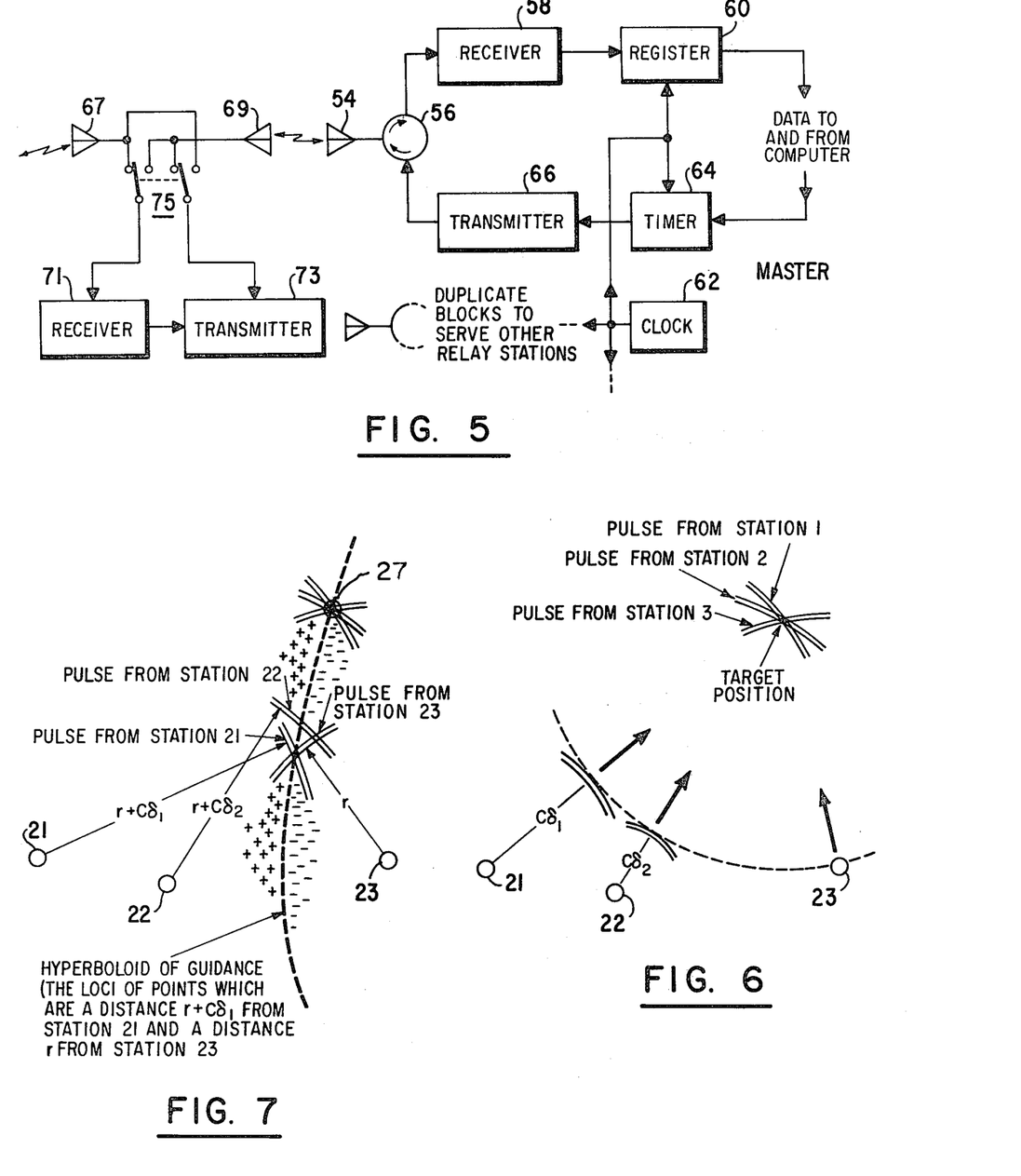
FIG. 5 is a block diagram of a relay type ground station.
FIG. 6 is a diagram showing ground station pulse timing for hyperbolic missile guidance.
FIG. 7 is a diagram showing how the hyperboloid of guidance is established and missile yaw corrections are determined.

The ground station shown in FIG. 5 is a relay-type and differs principally from the ground station of FIG. 4 in that all time of arrival clocking is done at a master station. Each relay station includes two antennas 67, and 69 coupled to a receiver 71 and transmitter 73 by means of a switch 75. Pulses transmitted by the aircraft 26 (FIG. 1) are received at antenna 67 and its own pulses are transmitted from antenna 69 to antenna 54 of the master station which is the same as the master station of FIG. 4 except there is no requirement for the synchronization means.

With the target coordinates determined with respect to the three ground stations, the computer is able to apply similar hyperbola-based computations to relate the target position to the timing of hyperbolic guidance pulses which are to be emitted by these same ground stations. Specifically, the computer is able to determine the difference in the timing of pulses from each station to the next such that the pulses from all three ground stations arrive at the target (or at a point in the air space just above target) simultaneously. This situation is illustrated in FIG. 6. In the particular case shown, the pulse from station 21 is emitted with a lead time of $\delta_1$ with respect to the pulse from station 23, and similarly the pulse from station 22 is given a lead time of $\delta_2$ over that from station 23. With all pulses traveling at the velocity of light, c, this timing arrangement results in all three pulses being equidistant from the target at any point in time after the third pulse is emitted. After a suitable interpulse interval, each of the stations emits a second pulse with the same relative timing that was used for the first pulse, and this cycling is continued for as long as necessary for missile guidance purposes. Once the delays $\delta_1$ and $\delta_2$ are established they remain the same for succeeding cycles. With the necessary delay ($\delta_1$ or $\delta_2$) for a particular ground station computed, the delay data is used to preset timer 64 (FIG. 4) which in turn generates an output pulse when synchronized clock 62 has run for a time equal to that delay. The output pulse from timer 64 triggers transmitter 66 in each station, and the resultant transmitter pulse is radiated from antenna 54.

Since the antennas of the individual ground stations are broad beam, the guidance pulses emitted are propagated through much of the air space above the measurement base and out over adjacent enemy territory. Within this air space an imaginary three dimensional grid of hyperbolic coordinates is thus established, with each point in the grid being identified with a particular time sequence of pulse reception from the three stations, and with a particular altitude. The air space is divided into two portions by an imaginary "hyperboloid of guidance" which is illustrated and defined in FIG. 7. As shown, the hyperboloid of guidance is characterized by a coincidence in time of arrival of the guidance pulses from the two outer ground stations 21, 23 and it passes through target 27. At all points to the left of the hyperboloid, the pulse from station 21 will be received ahead of the pulse from station 23, while at all points to the right the opposite will be true. If a missile is launched at some point within friendly territory and pointed in the general direction of target 27, it can use the information contained in the 21-23 pulse sequence to maneuver in yaw until its flight path lies along the hyperboloid. Arrival of pulses from station 21 ahead of pulses from station 23 is used to guide the missile to the right and the opposite sequence of reception of pulses to guide the missile to the left, which thereby confines it to the hyperboloid, where the pulses from stations 21 and 23 arrive simultaneously.

Figure 8:
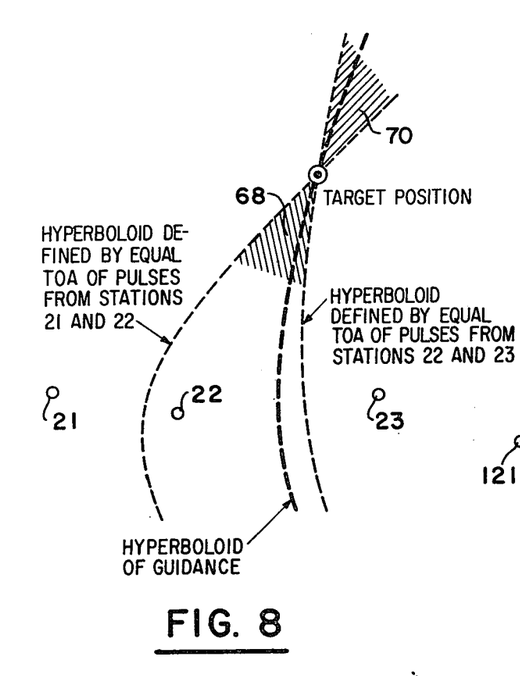
FIG. 8 is a diagram showing how pitch corrections are determined by hyperbolic guidance.

With hyperbolic guidance, the missile should be programmed to follow a ballistic trajectory or a constant-altitude cruise trajectory until it nears the target. As can be seen in FIG. 7, while the missile is in this approach phase the pulse from station 22 has reached and passed the missile position by the time the other two pulses arrive. However, as the missile, which is following the hyperboloid of guidance, nears the target, the pulses from stations 21 and 23 arrive more nearly at the time of pulse 22, until, as noted, all three pulses arrive simultaneously when the missile is just over the target position. Thus, the missile has a means of monitoring the rate at which it is nearing the target position, and can use this information to establish a dive trajectory that will bring it down on the target when it impacts the surface. If a nearly vertical terminal approach is selected, the missile can "tuck under" to get back to the target if it happens to go beyond the point where all three pulses arrive coincidentally. As shown in FIG. 8 when the missile follows the hyperboloid of guidance and moves from the vicinity of the ground stations toward the target, it is first in a region (indicated by crosshatching 68) where station 22 pulses are first to arrive. If it continues along the hyperboloid of guidance and does not dive steeply enough as it approaches the target, it will pass into another region (again indicated by crosshatching 70) where the station 22 pulses arrive last. These crosshatched regions 68 and 70 are bounded by two additional hyperboloids that are defined by coincidences of pulses from stations 21 and 22 and pulses from stations 22 and 23, respectively. In practical situations, the curved line at which these three hyperboloids intersect (i.e., where all three pulses arrive simultaneously) closely approximates a straight vertical line leading downward to the target position. If, through yaw error, the missile strays from the hyperboloid of guidance into one of the regions not crosshatched (where the number 22 pulse arrives second instead of first or last) the missile must first correct its yaw position to return to a crosshatched region, and then correct its pitch position if necessary.

Figure 9:
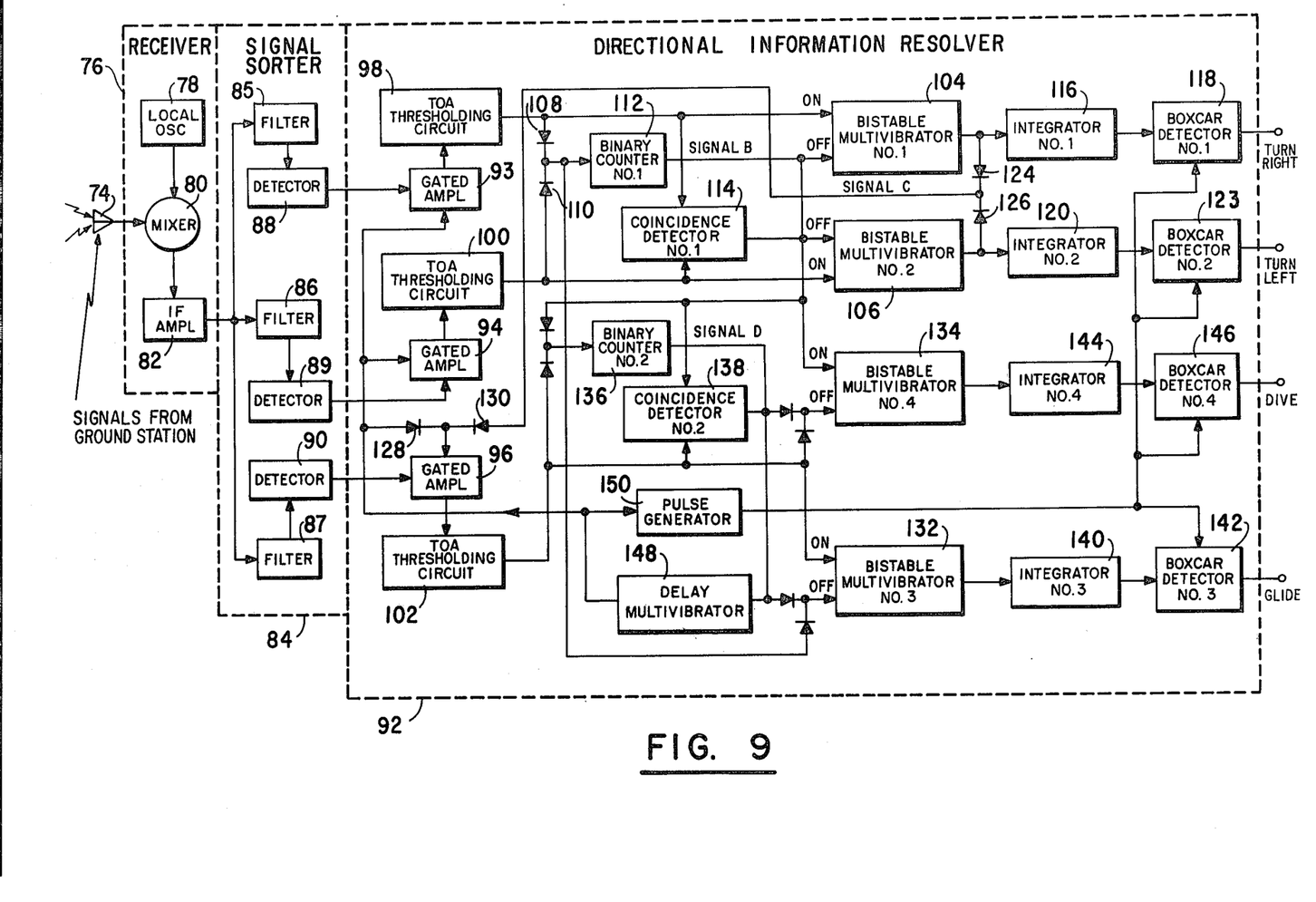
FIG. 9 is a detailed block diagram of the missile hyperbolic guidance module.

FIG. 9 is a block diagram of the missile circuitry for performing the hyperbolic guidance function. Pulses from ground stations are received through a rearward-directed but suitable broadbeam microwave antenna 74 and fed to a microwave receiver 76 consisting of a local oscillator 78, mixer 80 and IF amplifier 82. The signal out of IF amplifier 82 is coupled to signal sorter 84 which has three channels each having a tuned filter and a detector. Filter 85 is tuned to pass signals received from station 21 and is designated the "right" channel. Filter 86 is tuned to pass signals received from station 23 and is designated the "left" channel. Filter 87 is tuned to pass signals received from station 22 and is designated the "glide" channel. Detectors 88, 89, and 90 then convert the IF signals into video pulses.

Directional information resolver 92 which follows signal sorter 84 has as its function the determination of the relative time of arrival of the three ground station pulses and the derivation of guidance correction signals therefrom. An auxiliary function is provided by three gated amplifiers 93, 94, and 96 which are gated following reception of the three pulses that constitute a set and are not gated on again until the next set is expected. Gated amplifiers 93, 94, and 96 are followed by time of arrival threshold circuits 98, 100, and 102, respectively, which can be similar in design to the corresponding circuits in the ground stations were not mentioned heretofore.

The signals received from stations 21 and 23 are used to trigger two yaw channel bistable multivibrators 104 and 106, respectively. Bistable multivibrators 104 and 106 are triggered into conduction by the first pulse that reaches their "on" input terminal, and are turned off by the first pulse that reaches their off terminal. The time of arrival pulses are applied directly to the "on" inputs and indirectly to the "off" inputs of bistable multivibrators 104 and 106. For the indirect application, the right channel and left channel pulses are combined into a single third channel (signal A) using diodes 108 and 110 to prevent cross coupling between the right and left channels. Signal A is applied to the input of binary counter 112. Counter 112 may be of any of several circuit designs used for digital computer applications; one specific design would be a multibirator similar to the bistable multivibrators 104 and 106, except that it would be biased so as to turn on with the first pulse received even though there was a simultaneous input at the off terminal, and then to turn off with the second pulse or after a significant interval if no second pulse appeared. The output of binary counter 112 is a signal coincident with either the right or left channel time of arrival pulse, depending upon which occurs later. If the right and left time of arrival pulses occur simultaneously there will be no second pulse and binary counter 112 will have no output. To avoid this, a coincidence detector 114 is connected between the two channels and its output is directly coupled to the output of binary counter 112. The combined output is signal B. Signal B is only one pulse since the two contributing circuits operate on a mutually exclusive basis. Signal B is the indirect signal applied to the off input terminals of both bistable multivibrators 104 and 106. Bistable multivibrator 104 therefore switches on when the right pulse arrives first and switches off when the left pulse arrives. It does not switch on when the right pulse arrives later than the second because the signal from binary counter 112 is then coincident with the right pulse. Similarly, bistable multivibrator 106 switches on with the left pulse and off with the right when the left pulse is the first of the two, but does not switch on when the left pulse occurs later. When the left and right pulses are coincident, the application of signal B to the off inputs prevents both bistable multivibrators 104 and 106 from switching on.

The output from bistable multivibrator 104 (which, by the above action, begins when the right pulse arrives and ends when the left arrives) is applied to integrator 116, which may be of the diode/RC type. The output of integrator 116 is a sawtooth voltage with the peak voltage being proportional to the lead time of the right pulse with respect to the left pulse. Boxcar detector 118 detects and stores this peak output voltage from one set of pulses to the next, and provides an output indicating that the missile should correct its course to the right and gives an indication of how much correction is needed. In a similar way, the rectangular output wave from bistable multivibrator 106 is used in conjunction with integrator 120 and boxcar detector 123 to provide a left directional output signal.

In addition to the signals and outputs described above, the yaw channel provides a gating signal to eliminate use of the glide channel (station 22) pulses from time of arrival pulse whenever that pulse is the second of the set of three received. This has the effect of disabling pitch channel operation. In the event the missile strays into one of the two non-crosshatched regions of FIG. 8, gating signal C is used to disable the pitch channel. Signal C is obtained by using diodes 124 and 126 to combine the outputs from bistable multivibrators 104 and 106. Signal C is a rectangular signal that is begun at the time of arrival of either the right or the left pulse, whichever arrives first, and is terminated at the time of arrival of whichever of these two pulses arrives later. If the glide pulse is the second of the three received, this of course means that signal C will have begun but not terminated at the instant of glide pulse reception. Application of signal C to gated amplifier 96 to gate off the glide channel results in the elimination of the glide pulse when it occurs second, and only then. Diodes 128 and 130 are used for isolation of the two gates associated with gated amplifier 96.

The pitch or dive channel signal is derived similar to the yaw signals described above. When the missile is short of a position above the target, the glide pulse is the first of the three received and its arrival causes bistable multivibrator 132 to switch on. Multivibrator 132 is then returned to the off condition by the first pulse in signal A (i.e., by whichever of the yaw pulses is the first to follow the glide pulse, or by both yaw pulses if they are coincident). Similarly, if the missile strays into the crosshatched identified region beyond the target, bistable multivibrator 134 will be switched on by signal B (which coincides with the second of the yaw pulses) and will be switched off again by the glide pulse, which in this case is the third pulse to be received. To prevent bistable multivibrator 132 from being triggered by the glide pulse when that pulse is received third, and to prevent bistable multivibrator 134 from being triggered by signal B when it is coincident with the third pulse received (which is the case when the glide pulse is first), a fourth signal, identified as signal D is introduced. Signal D is derived from a combination of binary counter 136 and coincidence detector 138 in a manner directly corresponding to that in which signal B was derived. Since the inputs to coincidence detector 138 are the glide signal and signal B, and since counter 136 causes signal D to be coincident with the latter of these two, signal D will always be coincident with the last pulse in the received set, or with the last pulses if a coincidence of two or more is involved. With operation of bistable multivibrators 132 and 134 established, integrator 140 and boxcar detector 142 will convert the rectangular output wave of bistable multivibrator 132 to a voltage output that varies in proportion to the amount by which the pulse from ground station 22 leads the first of the other two pulses, and similarly integrator 144 and boxcar detector 146 will provide a voltage proportional to the amount by which the second of the stations 21 and 23 pulses leads the station 22 pulse.

Signal D is also used as a trigger pulse for delay or "one shot" multivibrator 148 that controls gated amplifiers 93, 94, and 96 and thereby gates out extraneous pulses between the times that ground station pulses are due to be received. The trailing edge of the gate provided by the delay multivibrator 149 is used to trigger pulse generator 150, and the output of the latter is used as a pulse to clear boxcar detectors 118, 122, 142 and 146 so they can respond to the next data cycle.

Figure 10:
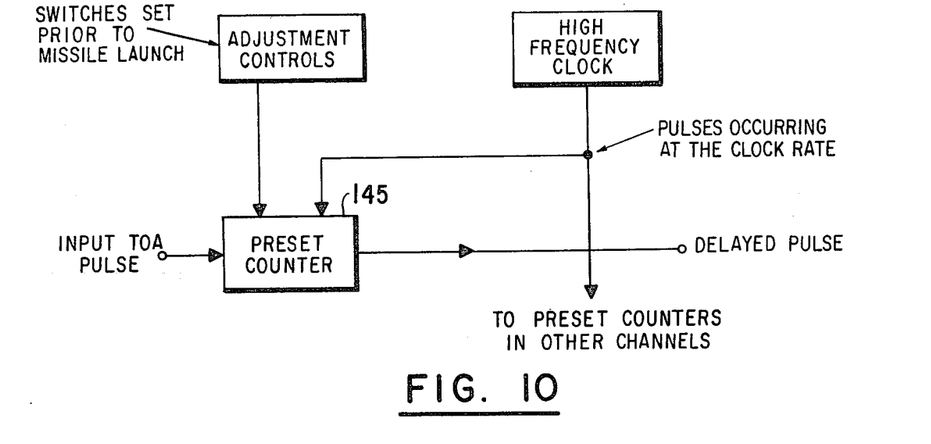
FIG. 10 is a block diagram of precision delay circuit for time of arrival systems.

In the hyperbolic missile guidance technique described above, a number of missiles that may be flown simultaneously will all be guided to the same target-namely, that at the position where all three ground station signals arrive simultaneously. However, an alternate form of the above guidance circuit can be provided which will permit attacks on a number of different targets simultaneously while using the same set of ground station pulses. With this alternate form, the three ground stations can be pulsed with some arbitrary but precisely known time relationship (e.g., all three can be pulsed at precisely the same instant). A precision delay circuit such as that shown in FIG. 10 is then inserted in at least two of the three pulse channels in the directional information resolver unit of each missile guidance module. The delay circuit of FIG. 10 could be inserted immediately following the time of arrival thresholding circuit. Referring to FIG. 7, if all three ground stations are made to transmit a pulse simultaneously, and if the precision delay inserted in the station 23 reception channel in the missile is adjusted to equal $\delta_1$, the right and left pulses will reach the bistable multivibrators in the missile directional information resolver simultaneously when the missile is positioned along the hyperboloid of guidance (i.e., the right pulse will arrive at a time $$\frac{r + c\delta_1}{c}$$

and the left at a time $(r/c) + \delta_1$ after transmission). Similarly, if the delay in the station 22 reception channel is made equal to $\delta_1 - \delta_2$, the glide pulse will reach the bistable multivibrators simultaneously with the other two pulses when the missile is positioned over the desired target (i.e., the glide pulse will arrive at a time $$\frac{r + c\delta_2}{c} + (\delta_1 - \delta_2), \text{ which equals } \left(\frac{r}{c} + \delta_1\right).$$

The missile will guide to the particular target position designated by the adjustment of preset counter 145 in the same manner that it was guided to the target position designated by ground station pulse coincidence in the circuit of FIG. 9 described above. If the ground station pulses are emitted in some synchronized sequence rather than simultaneously, the same results can be achieved by subtracting the relative delay in the emission of the station 21 pulse from the delay set into the station 21 channel preset delay, and by making similar adjustments in the other channels. The delay adjustments will normally be made prior to missile launch.

Figure 11:
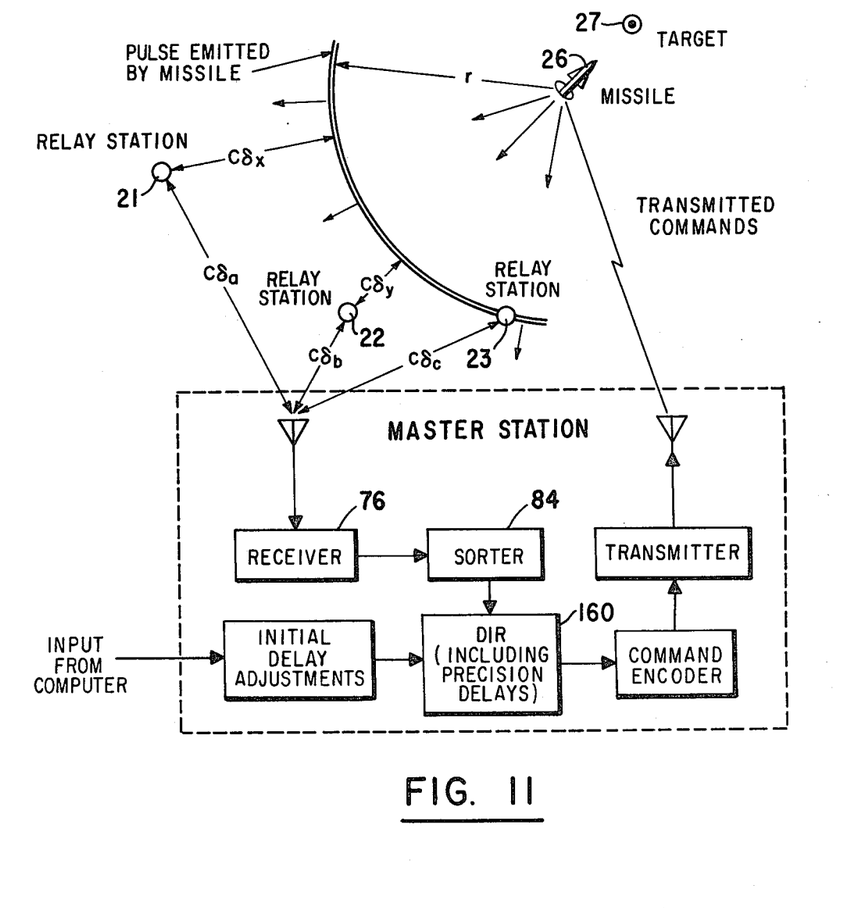
FIG. 11 is a block diagram of an inverse hyperbolic missile guidance.

An alternative missile guidance arrangement is shown in FIG. 11. This is similar to the hyperbolic types discussed above, but in this case the ground stations do not emit pulses and hence a hyperbolic grid is not established in the usual sense. Instead, the missile emits pulses on a frequent or continuous basis in the same manner that the reconnaissance aircraft emitted pulses at two or more points in its trajectory. Since in this case the pulses travel in the opposite direction than they do for the above hyperbolic guidance cases, this alternative has been termed inverse hyperbolic guidance.

The system of FIG. 11 uses a directional information resolver 160, of the type shown in FIG. 9, to determine the necessary commands to be sent to the missile. In this case directional information resolver 160 includes precision delay circuits (such as shown in FIG. 10) in at least two of the three input channels. As in FIG. 9 each of the channels carries the pulse received from a particular ground station, but in this case the respective pulses are repeats of the missile pulse as relayed by the three relay-type ground stations. As indicated in FIG. 11, the pulses from the missile 26 as received at the master station via station 21 arrive with a relative delay of $\delta_x + \delta_a$, while that via station 22 has a delay of $\delta_y + \delta_b$ and that via station 23 has a delay of $\delta_c$. If the precision delay of FIG. 10 that is inserted in the right channel of the directional information resolver 160 is zero, the delay in the left channel is $\delta_1 + \delta_a - \delta_c$, and the delay in the glide channel is $\delta_1 + \delta_a - \delta_2 - \delta_b$, the yaw output will be zero when missile 26 is on the hyperboloid of guidance as defined in FIG. 7, and the pitch output will be zero when directly over the intended target 27. Guidance signals which appear at the output of directional information resolver 160 serve to generate commands which will guide the missile in the same way that it was guided with the directional information resolver located in the missile (FIG. 9). The precision delays for directional information resolver 160 are set in from targeting data prior to the missile flight, and remain unchanged so long as a particular target is under attack.

Figure 12:
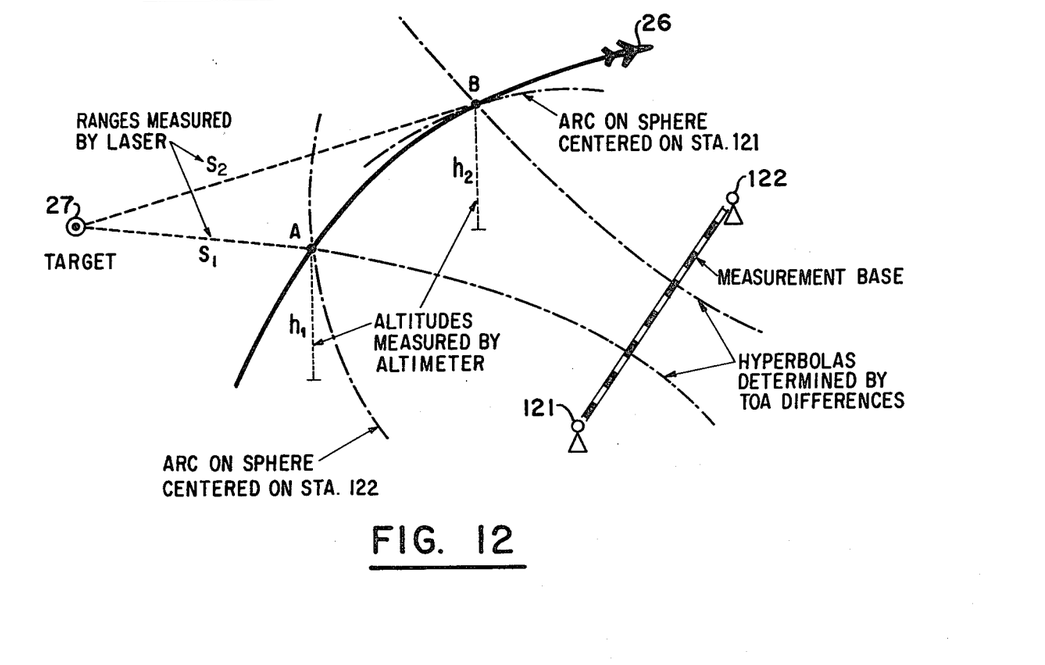
FIG. 12 is a schematic diagram of a modification of the invention using only two time of arrival-type ground stations.

Target location using only two ground stations is illustrated in FIG. 12. Here aircraft 26 proceeds as described previously and measures the aircraft-to-target range and the aircraft altitude for at least two measurement points, A and B. The coordinates of points A and B are now determined by reference to a grid comprising hyperboloids orthogonal to the base line joining the two stations and spheres centering on either or both of the stations. In FIG. 12 the coordinates of point A are defined by the aircraft altitude, a hyperboloid based on the two ground stations 121 and 122, and a sphere centered at ground station 122. Similarly, point B is defined by the altitude, another hyperboloid with the same base, and a sphere centered at ground station 121. In each case the particular sphere involved is determined by direct measurement of the radial distance from the ground station to the aircraft (or vice versa), and the hyperboloid is determined by the difference in the time of arrival of the pulses from the aircraft at the two ground stations 121 and 122.

To implement the two-station scheme for target location, any of the several previously described time-of-arrival measurement means may be used to determine the aircraft's hyperbolic coordinate, while the spherical coordinate may be determined by requiring that the particular ground station involved act as a transponder to the microwave pulse from aircraft 26. This requires only a multi- or omnidirectional antenna if a relay type ground station is used, or an additional connection for activating the pulse transmitter if a clock-type ground station is used. Reconnaissance aircraft 26 requires a microwave receiver, a range measurement circuit, and a third indicator. These elements provide aircraft-to-ground-station ranging in a radar manner directly analogous to the aircraft-to-target ranging by the laser shown in FIG. 2.

For the computation of the target position, knowledge of the distance between ground stations is necessary. With aircraft 26 equipped to receive transponded signals from both ground stations, and if in addition the transponded signal from one ground station retriggers the other station, the third or round-the-loop return pulse received by the aircraft will provide interstation distance (i.e., if the distance between ground stations is, d, and the distances from the aircraft to the ground station 121 and 122 are a and b, respectively, the aircraft can measure 2a, 2b, and a+d−b, from which d can be determined).

Figure 13:
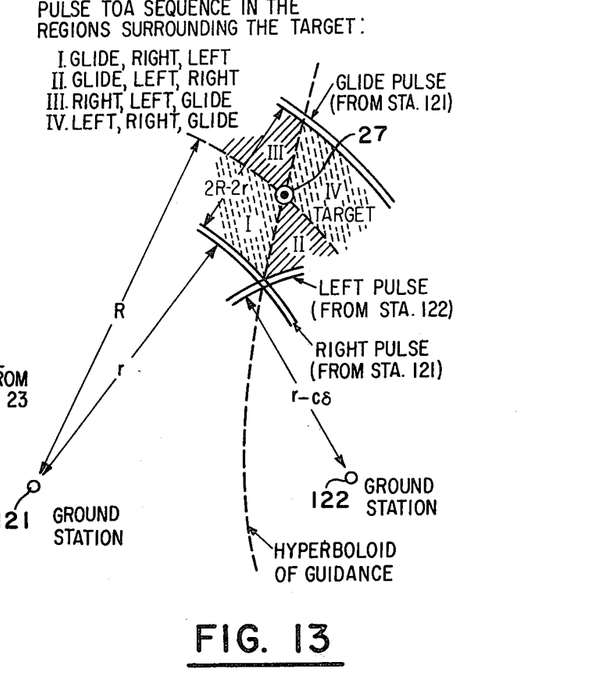
FIG. 13 is a schematic diagram of a multiple pulse missile guidance for the arrangement of FIG. 12.

One method of implementing the missile guidance step with the two-station arrangement is illustrated in FIG. 13. Here the target lies on the intersection of a hyperboloid of guidance and a sphere of radius R centered on station 121. The pulse sequence with this method begins with a trigger pulse emitted by station 121. In this case the missile is provided with a transponder which responds when the station 121 trigger pulse reaches the missile. Reception of the missile transponder pulse at station 121, which occurs at a time $2r/c$ after the trigger pulse (where r is the range from station 121 to the missile), results in the emission of a "guide" pulse (so identified by frequency or other coding means). Regardless of the timing of this glide pulse, station 121 also emits a "right" pulse (also distinctly identified) at a time $2R/c$ after the trigger pulse. Using synchronizing techniques such as described for the three station systems and using a delay $\delta$ calculated by the computer in the target location process, station 122 emits a "left" pulse at a time $$\frac{2R}{c} + \delta$$

after the trigger pulse is emitted at station 121. The result of this timing is that the dive pulse leads the right pulse by an amount $$\frac{2R}{c} - \frac{2r}{c}$$

which becomes 0 when r=R and negative when r>R) and the emission of the left pulse lags that of the right by $\delta$.

For a missile which is launched in the vicinity of the ground stations 121 and 122 and headed generally toward the target, the resultant time-of-arrival sequence of reception of the right and left pulses for missile positions to one side or the other of the hyperboloid of guidance is the same as in the three station situation, and the circuitry of FIG. 9 can be used to provide yaw guidance along the hyperboloid toward the target. Similarly, the glide pulse is the first of the three guidance pulses received (the trigger pulse is used for transponder action only) when the missile is short of the target range (i.e., r<R) and is the last pulse received when r>R, and hence the circuitry of FIG. 9 can also be used for pitch guidance to bring the missile down on the target at a range equal to R. By comparing FIGS. 7 and 13, for the more probable target/ground station geometries the glide pulse will be separated from the other two pulses by a greater interval when the two station system is used, and this provides higher sensitivity and contributes to greater accuracy in the pitch control loop. As is shown in FIG. 13, there are no regions about target 27 in which the glide pulse is the second to arrive, and hence no regions in which a yaw correction must be accomplished before the need of a pitch correction is sensed.

Figures 14, 16:
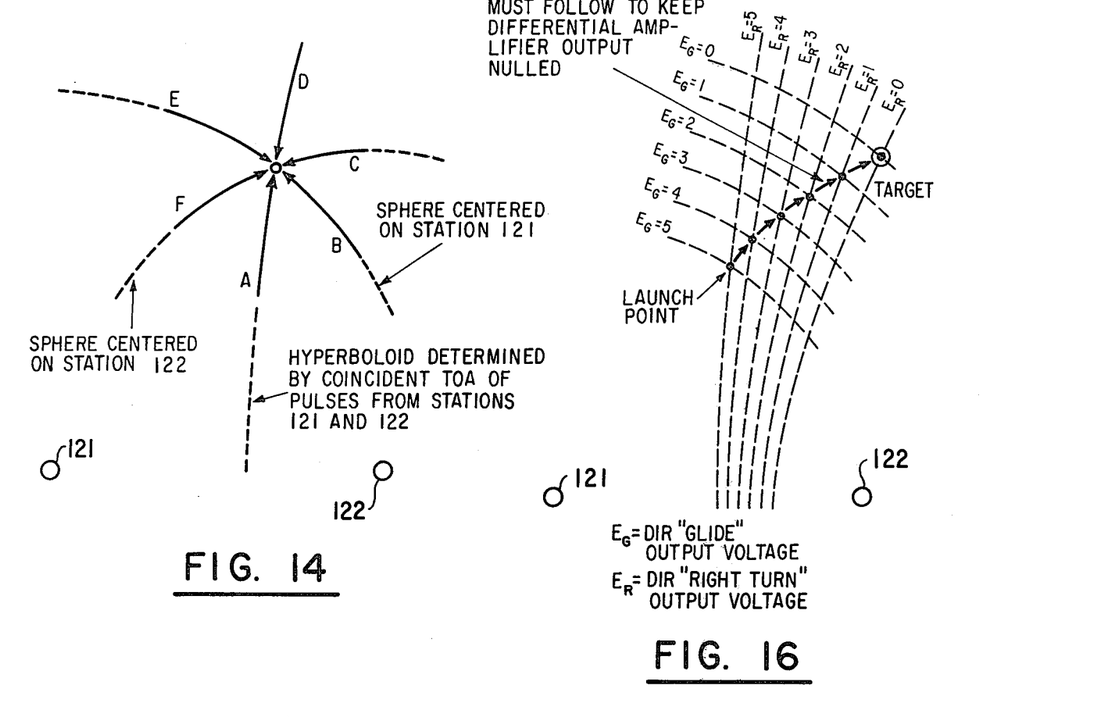
FIG. 14 is a schematic diagram of six different approach paths for the arrangement of FIG. 12.
FIG. 16 is a graph giving an example of missile yaw trajectory when the adaptive yaw circuit of FIG. 15 is used.

In addition to an approach along the hyperboloid of guidance from the vicinity of the ground stations toward the target, the two station system permits a missile approach from the opposite direction along the hyperboloid or in either direction along the spherical surface that constitutes the other coordinate of the target position. This situation is illustrated in FIG. 14. Approaches other than in the original direction along the hyperboloid of guidance (i.e., approach A) can be followed simply by identifying the pulses in a different manner. For example, approach B can be followed by using the "glide" pulse of FIG. 13 as the right pulse in the missile directional information resolver circuits, the "right" pulse of FIG. 13 as the left pulse in the directional information resolver circuits, and the "left" pulse of FIG. 13 as the directional information resolver glide pulse. This change in identity of the various pulses available from the ground stations can be effected by simply switching the particular filters in the missile sorter (see FIG. 9) from one channel to another. The availability of different approach directions is particularly advantageous for air launched missiles since this permits the launch aircraft pilot to select a flight path that provides the least exposure to enemy defenses and/or the greatest convenience with respect to his initial position or other flight requirements.

Figure 15:
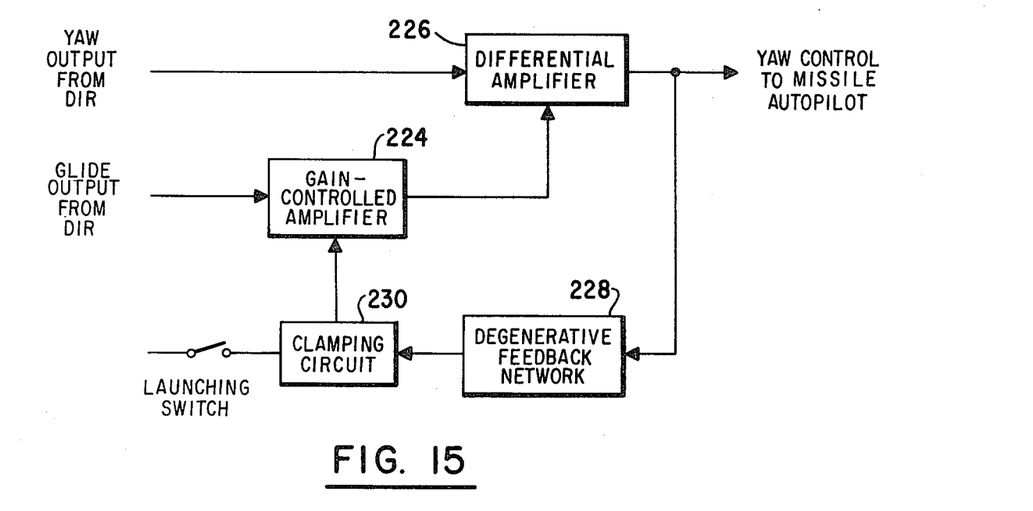
FIG. 15 is a block diagram of a circuit to adapt missile control to direct yaw approach to target from any initial aspect angle.

The six paths or lines of approach discussed above can be expanded into an infinite number of lines of approach, each of which is a slightly curved path directed toward the target, by use of the additional circuitry shown in FIG. 15. The glide output signal of the directional information resolver is amplified in amplifier 224 and compared with the right or left output (whichever is not zero at the position where the missile is launched) in differential amplifier 226. The output of differential amplifier 226 is used to control the missile in yaw. Amplifier 226 may have a gain of more than or less than unity, but although this gain may be varied prior to missile launch, it is held constant during the missile flight. Prior to launching, the output of differential amplifier 228 is coupled through feedback network 228 and clamping circuit 230 to gain controlled amplifier 224 to control the gain in such a way as to null the differential amplifier output. Upon launch the feedback action is disrupted by activation of clamping circuit 230, and amplifier 224 is left with the particular gain it had at the instant of launch. In this way the missile guidance system adapts itself to follow a particular yaw approach leading in an only slightly curved path directly from the launch point to the target, and does not attempt to correct its yaw position to coincide with one of the six paths discussed above. An example of a new yaw path which the missile may follow after this adaptive process is shown in FIG. 16. In the example shown, differential amplifier 226 causes the missile to guide in yaw so that when the amplified glide output is 4 volts the right output is 4 volts, when the glide output is 3 volts the right is 3 volts, etc. (For a launch point to the right of the hyperboloid passing through the target, a corresponding equality of amplified glide output and left output would be required.) In pitch the guidance remains the same as it would be if the nearest of the above six paths were being used for yaw guidance.

Figure 17:
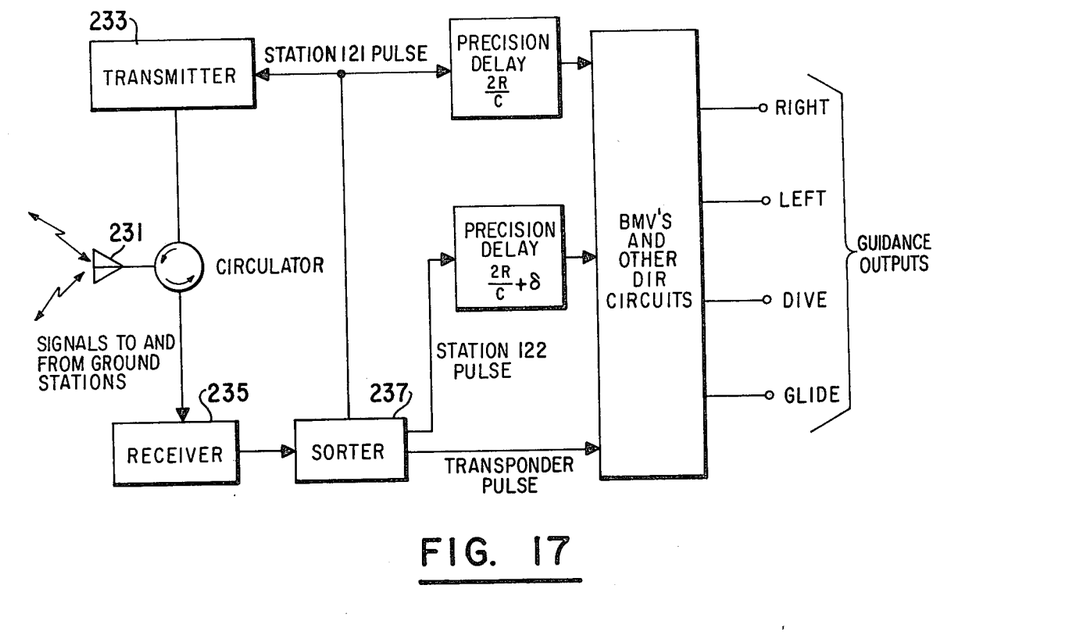
FIG. 17 is a block diagram of a missile guidance circuit used with two ground stations pulses simultaneously.

A second way to implement the missile guidance with two ground stations corresponds to the second technique discussed for the three ground stations; i.e., rather than time the ground station pulses to define a particular target position, the ground stations are pulsed with some arbitrary but precisely related timing (e.g., both at the same instant) and the position of the hyperboloid of guidance is determined by the relative values of precision delays (as shown in FIG. 10) set into the appropriate missile directional information resolver channels prior to launch. As before, this permits missiles to be flown against two or more targets simultaneously. A block diagram for this guidance arrangement is given in FIG. 17. Pulses transmitted from station 121 are received at antenna 231 and fed to transmitter 233 through receiver 235 and signal sorter 237. Transmitter 233 is triggered and transmits a pulse that is received by a transponder coded for this particular missile, located at station 121. The returning transponder pulse follows the station 121 pulse by a delay of $2r/c$ (where r again is the distance from station 121 to the missile at that instant). Meanwhile, assuming that station 121 and 122 pulses were omitted at precisely the same instant, these two pulses as received at the missile are delayed by preset precision delays of $$\frac{2R}{c} \text{ and } \frac{2R}{c} + \delta$$

respectively before being applied to the directional information resolver processing channels. Comparison of the resultant relative times of arrival of the transponder, station 121, and station 122 pulses at the missile with the relative times of arrival of the glide, right, and left pulses in the system of FIG. 13 shows the relative times of arrival to be identical, and hence the arrangement of FIG. 17 will provide the same type of missile guidance. The circuit of FIG. 15 may be added to permit approaches to the target from many angles.

Figures 18, 19, 20:
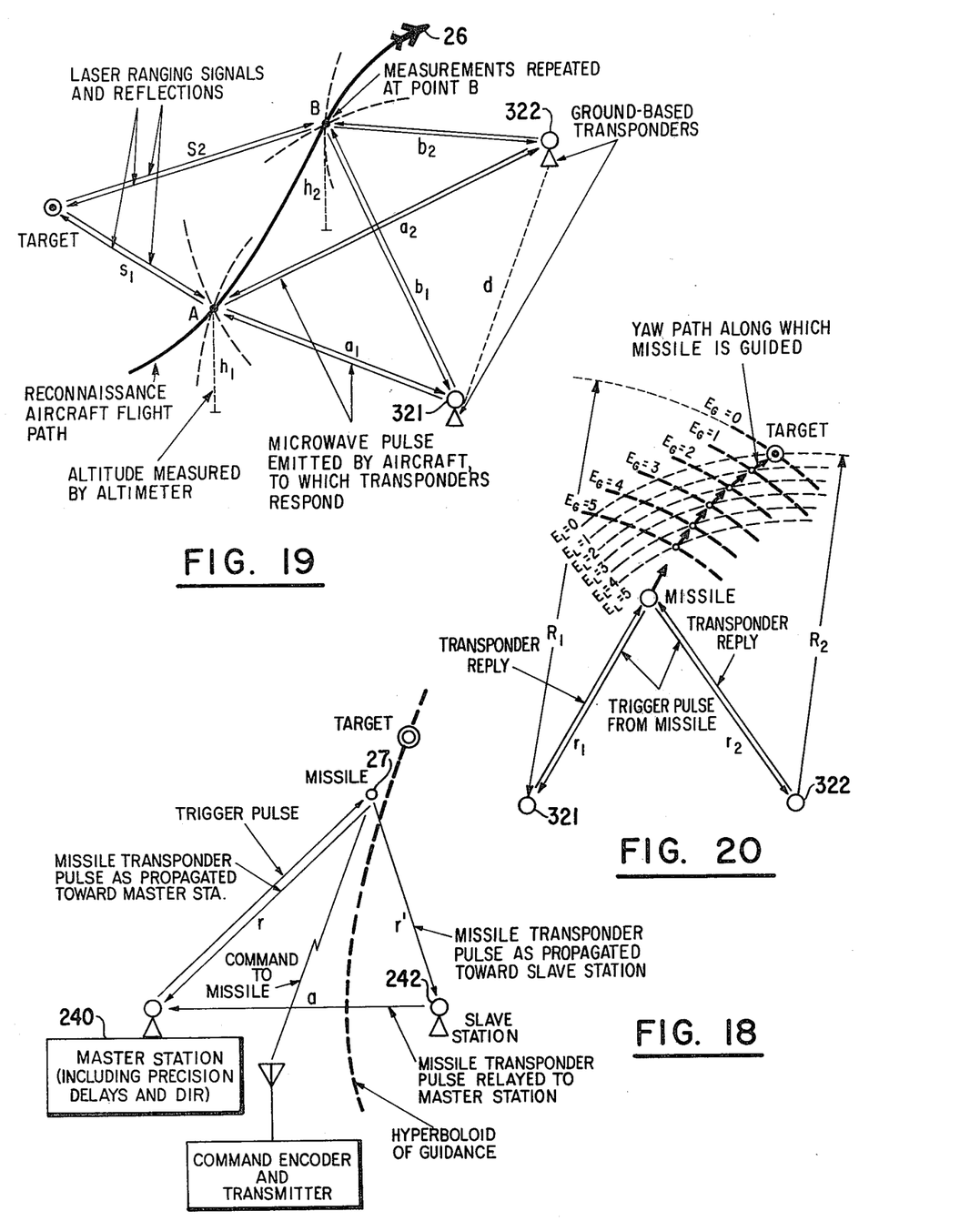
FIG. 18 is a diagram showing missile guidance using two ground stations and a command link.
FIG. 19 is a modification of the invention using ground-based transponders.
FIG. 20 is a graph giving an example of missile guidance using the modification of FIG. 19.

Another alternate form of guidance utilizing only two ground stations is shown in FIG. 18. This corresponds to the three-station inverse hyperbolic method shown in FIG. 11; in both, the missile carries only a transponder and command receiver, and guides in conformance with the received commands. In the system of FIG. 18 master station 240 initiates the pulse cycle by transmitting a trigger pulse to the missile 27. A transponding pulse is then transmitted from missile 27 and is received at both master station 240 and a second or "slave" ground station 242. In response to the pulse from missile 27, station 242 relays a pulse to master station 240. Within master station 240 a precision delay circuit provides a pulse that follows the trigger pulse with a delay of 2R/c. This pulse differs in timing from the time of arrival of the pulse received directly from the missile transponder by an amount $$\left(\frac{2R}{c} - \frac{2r}{c}\right)$$

that is identical to that involved with pitch guidance in the system of FIG. 13, and hence it can be used by a directional information resolver in the master station to generate commands that will direct the missile to the spherical coordinate of the target. Similarly, another precision delay circuit within the master station generates a pulse that follows the pulse received directly from the missile transponder by a delay $$\frac{a}{c} - \delta,$$

where a is the distance between the slave and the master station and $\delta$ is again the derived delay that defines the hyperboloid passing through the target position. The pulse from this second delay circuit occurs at a time that follows the trigger pulse by an interval of $$\frac{2r}{c} + \frac{a}{c} - \delta,$$

while the missile transponder pulse relayed by the slave station arrives at the master station 240 after a total propagation delay of $$\frac{r + r' + a}{c}$$

following the emission of the trigger pulse. If $r' = r - c\delta$, which occurs when the missile is at any point directly on the hyperboloid of guidance, these two pulses will occur simultaneously. The simultaneity of the latter pulses will indicate proper position of the missile with respect to the hyperbolic coordinate of the target, and difference in their timing can be used by the directional information resolver to derive guidance commands to direct the missile to this coordinate.

The target location means as illustrated in FIG. 19, differs from the system previously described in that instead of employing time of arrival techniques, the location of points A and B with respect to transponders 321 and 322 is established by direct range measurements to each transponder from the aircraft when at that point. The coordinates of point A are established as the point at altitude $h_1$ on the circle of intersection of two spheres, one with radius $a_1$ centered on station 321 and the other with radius $a_2$ centered on station 322. Similarly the coordinates of B are $h_2$, $b_1$ and $b_2$. The length of the baseline d must also be known for the computer to fix both A and B uniquely with respect to the ground stations. With A and B known, the computer can then establish the target coordinates just as with the previously described systems.

Figure 21:
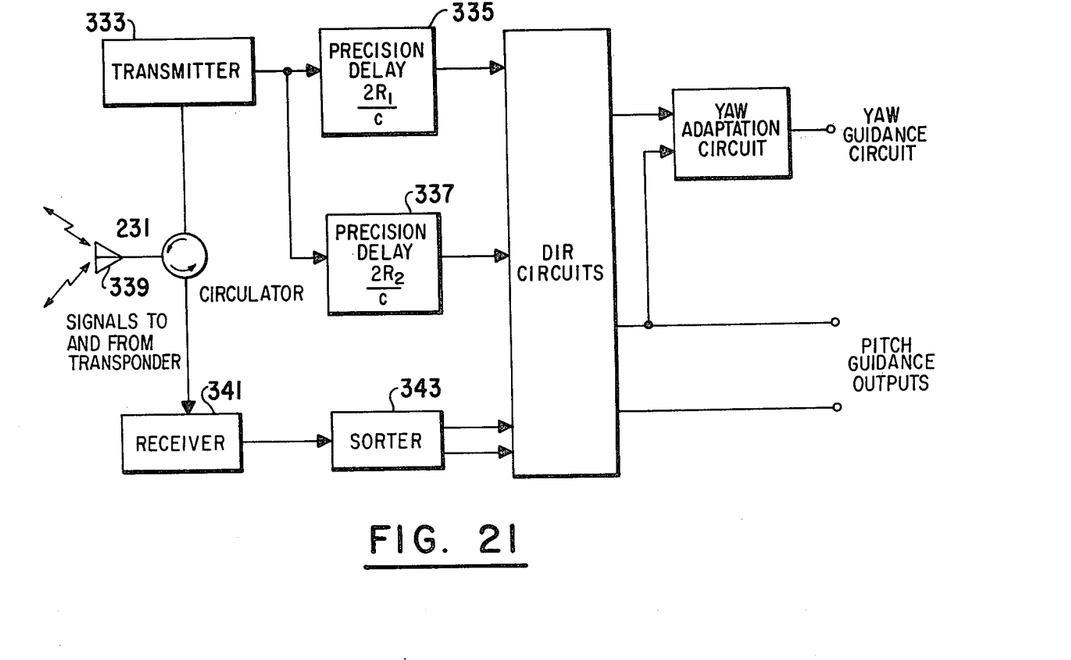
FIG. 21 is a block diagram of the missile circuits for the modification of FIG. 19.

Missile guidance using the transponder type ground stations is illustrated in FIG. 20. With this system the missile repeatedly transmits microwave trigger pulses, each of which brings a replay from each of the ground stations. Processing of the ground station reply signals then takes place in the missile circuits shown in FIG. 21, which circuits function in a manner generally analogous to the circuits previously described in connection with FIGS. 9 and 17. In effect this provides the missile with data on its exact range from each of the ground stations at all times, from which data (including the time derivative) the flight path to the predetermined target position is computed. In the functioning of the circuit shown in FIG. 21, yaw adaptation circuit 244 performs a yaw adaption function of the type described in connection with FIG. 15, and this guides the missile along an only slightly curved path to the target as illustrated in FIG. 20.

Obviously many modifications and variations of the present invention are possible in the light of the above teachings. It is therefore to be understood that within the scope of the appended claims the invention may be practiced otherwise than as specifically described.

What is claimed is:
1. In a missile guidance system for guiding one of a plurality of missiles to a surface target or targets the combination comprising:
 (a) an aircraft having target location equipment including a laser range finder, an altimeter, and a microwave pulse transmitter that are operated in synchronism for transmitting data for fixing a target location with respect to an artificial coordinate system;
 (b) a plurality of ground stations, each of which receives the microwave pulse signals from the aircraft, and supplies output signals from which the target location relative to the ground station positions can be determined based on pulse time of arrival data and the said laser ranging and altimeter data;
 (c) transmission means associated with at least one of the said ground stations for transmitting guidance information to at least one missile;
 (d) receiving, sorting, and signal processing means within said missile for receiving and extracting said guidance information from said ground station in order to direct the missile in yaw toward a point approximately above the target and then downward toward the target in pitch; and
 (e) directional information resolver circuit means for using the differences in times of arrival of pulses in order to establish the instantaneous position of the missile in terms of coordinates that constitute said artificial coordinate system.

2. The system of claim 1 wherein said plurality of ground stations comprise three clock-synchronized stations of the transceiver type.

3. The system of claim 1 wherein said plurality of ground stations comprise three relay type stations and a master station.

4. The system of claim 2 wherein two of said stations have precision delay circuits to provide the required pulse timing.

5. The system of claim 1 wherein said directional information resolver circuit is located in the missile and comprises a plurality of information channel circuit means, each of said channel circuit means including:
 (a) a gated amplifier having an input coupled to the output of said signal sorter and having an output,
 (b) a time of arrival threshold circuit having an input coupled to the output of said gated amplifier and having an output,
 (c) a bistable multivibrator having an input coupled directly to the output of said time of arrival threshold circuit, an off input coupled indirectly to the output of said time of arrival threshold circuit and having an output,
 (d) an integrator circuit having an input coupled to the output of said bistable multivibrator and having an output,
 (e) a boxcar detector having an input coupled to the output of said integrator and having an output coupled to an output terminal.

6. The system of claim 5 wherein said directional information resolver includes means for gating off reception of input signals for a predetermined time duration when a set of pulses has been received from said ground stations.

7. The system of claim 5 wherein said information channel circuit means includes a turn right channel, a turn left channel and a pitch channel, the outputs of the bistable multivibrators of said turn right and turn left channels of said information channels are coupled to the gated amplifier of the pitch channel of said information channels for preventing a pulse signal to enter said pitch channel when the pulse transmitted by said second station arrives at a time between the arrivals of the pulses of the other two stations.

8. The system of claim 5 wherein said ground station transmit pulses simultaneously to more than one missile, each missile having a time delay circuit adjusted to cause each missile to guide to a different target.

9. The system of claim 3 wherein said missile includes a pulse transmitter for transmitting pulses to said relay stations where the pulses are re-transmitted, signal processing means located at said master station for receiving said pulses and transmitting guidance command signals back to said missile.

10. The system of claim 1 wherein said plurality of ground stations comprise only two clock-synchronized stations.

11. The system of claim 10 where said signal processing means within said missile includes a circuit for generating yaw control signals to direct said missile to the target directly from the launch point.

12. In the system of claim 10, each of said ground stations being pulsed simultaneously and two precision delay circuits included in said signal processing means within said missile for establishing the target coordinates.

13. The system of claim 1 wherein said plurality of ground stations comprise a master station including precision delay circuits and said direction information resolver and a command encoder and transmitter for transmitting guidance command signals to the missile, and a slave station for relaying transponder pulses received from said missile to said master station.

* * * * *